United States Patent [19]

Chang

[11] Patent Number: 4,788,239

[45] Date of Patent: Nov. 29, 1988

[54] WATER-BASED NEOPRENE CONTACT CEMENT COMPRISING IONIZABLE RESIN MIXTURE IN A COPOLYMER OF CHLOROPRENE AND METHACRYLIC ACID

[75] Inventor: Wei T. Chang, Dayton, Ohio

[73] Assignee: Beecham Home Improvement Products Inc., Dayton, Ohio

[21] Appl. No.: 894,930

[22] Filed: Aug. 8, 1986

[51] Int. Cl.$^4$ .................. C08J 23/00; C08J 29/04; C08J 93/00
[52] U.S. Cl. .................................. 524/271; 524/273; 524/803; 524/798
[58] Field of Search ................. 524/798, 803, 271, 273

[56] References Cited

U.S. PATENT DOCUMENTS 4,183,834  1/1980  Evans et al. ................ 524/798

OTHER PUBLICATIONS

Fischer, Colloidal Dispersions, Wiley, (N.Y.), 1950, p. 247.
Handbook of Adhesives, Second Edition, Van Nostrand Reinhold Company, 1977, pp. 331–367.
DuPont Neoprene Latex 115 data sheet.

Primary Examiner—Harold D. Anderson
Assistant Examiner—Dennis R. Daley
Attorney, Agent, or Firm—Jacobs & Jacobs

[57] ABSTRACT

An aqueous contact cement, which comprises a dispersion in water of a chloroprene copolymer of 2-chloro-1,3-butadiene and methacrylic acid and a resinous polyelectrolyte of an ionizable resinous mixture which is ionized with a volatile ionizing atent, and ionizable resinous mixture being the reaction product of a rosin, a carboxylic acid, and a $C_1$–$C_{18}$ mono-alcohol, said ionizable resinous mixture having a softening point not substantially above about 125° C. and an acid number of between about 30 and 150, said reaction product comprising the carbocyclic nucleus of rosin having at least one carboxylic acid group and at least one carboxylic acid ester group of said mono-alcohol.

12 Claims, No Drawings

WATER-BASED NEOPRENE CONTACT CEMENT COMPRISING IONIZABLE RESIN MIXTURE IN A COPOLYMER OF CHLOROPRENE AND METHACRYLIC ACID

The present invention relates to contact cement, and more particularly to water-based neoprene contact cement.

Contact cement is applied to each of two substrates, and after the substrates have dried, they are pressed together to provide good contact with one another. The resulting bond is immediate and sufficiently strong to hold the substrates together without further clamping, pressing or airing.

Neoprene has been used in neoprene solvent-based contact cements, wherein the neoprene acts as an elastomeric binder. The neoprene is dissolved in a solvent and metal-reacted tertiary butyl phenolic resins are added to impart stability, adhesion and hot cohesive strength.

While the solvent-based neoprene contact cements have acceptable performance characteristics, nevertheless the use of the volatile solvent therein raises air pollution and safety problems, as well as costs of the solvent. Accordingly, water-based neoprene contact cements would be desirable.

Recently, water-based neoprene contact cements have been proposed, but nevertheless these cements are still not entirely satisfactory. For example, a typical water-borne neoprene contact cement contains a significant amount of toluene in the resin phase, and a dibasic metal oxide is necessary to cross-link the system to provide high temperature performance properties.

Neoprene copolymers having carboxyl functionality are available as latexes, and as stated on page 363 of Handbook of Adhesives, Irving Skeist, Second Edition, 1977, Van Nostrand Reinhold Company, New York, these carboxyl functionality neoprene latexes have been proposed for use as in adhesives. However, these latexes are disclosed as requiring ionic cross-linking with metal oxides, such as zinc oxide and magnesium oxide, for room temperature curing.

The present invention provides a neoprene contact cement free from organic solvents. The neoprene contact cement according to the present invention is a purely aqueous system that is operable without the need for the dibasic metal oxides, such as magnesium oxide and zinc oxide, previously employed.

The present invention thus provides an aqueous contact cement, which comprises a dispersion in water of a chloroprene copolymer of 2-chloro-1,3-butadiene and methacrylic acid and a resinous polyelectrolyte of an ionizable resinous mixture which is ionized with a volatile ionizing agent, said ionizable resinous mixture being the reaction product of a rosin, a carboxylic acid, and a $C_1$–$C_{18}$ mono-alcohol, said ionizable resinous mixture having a softening point not substantially above about 125° C. and an acid number of between about 30 and about 150, said reaction product comprising the carbocyclic nucleus of rosin having at least one carboxylic acid group and at least one carboxylic acid ester group of said mono-alcohol.

The present invention is based upon the use, in combination, of a chloroprene copolymer having carboxylic functionality and a resinous polyelectrolyte as defined above, dispersed in water. Copolymers of 2-chloro-1,3-butadiene (chloro-butadiene) and methacrylic acid stabilized by polyvinyl alcohol are commercially available in the form of stable latexes. Typical properties of these latexes include a solid content of about 47%, a pH at 25° of about 7 and an acid equivalent (mols carboxyl/kg latex solids) of about 0.33. The average particle size of typical latexes of chloroprene copolymers having carboxyl functionality that are useful in the present invention is about 0.3 microns.

The resinous polyelectrolyte that is used in the present invention is described in detail in Evans et al., U.S. Pat. No. 4,183,834, which is incorporated herein by reference thereto. These resinous polyelectrolytes are commercially available from Sylvachem Corporation and useful materials are presently available under the AQUATAC trademark.

The resinous polyelectrolyte useful in the present invention is a resinous polyelectrolyte of an ionizable resin mixture which is ionized with a volatile ionizing agent. The ionizable resinous mixture is a reaction product of a rosin, such as a tall oil rosin, wood rosin, gum rosin, and mixtures thereof, a carboxylic acid, preferably an alpha,beta-ethylenically unsaturated carboxylic acid, most preferably an alpha,beta-ethylenically unsaturated dibasic acid, a mono-alcohol, such as a $C_1$–$C_{18}$ mono-alcohol, preferably decanol, and optionally a polyol.

The carboxylic acid is reacted, or preferably grafted onto the rosin. Preferably, the acid is an unsaturated dibasic acid described above, such as fumaric acid and its half ester, maleic acid and its half ester, maleic anhydride, and the like.

The mono-alcohol and polyol form a carboxylic ester with the reaction product of the rosin and acid. While the mono-alcohol can be used alone, it is preferred to use a mixture of a mono-alcohol and a polyol. Suitable polyols include ethyleneglycol, diethyleneglycol, triethyleneglycol, and other polyalkalene glycols, glycerol, pentaerythritol, and the like, preferably glycerol or pentaerythritol.

In general, the resinous mixture can be made from about 40 to about 85% rosin, from about 5 to about 20% acid, from about 10 to about 30% mono-alcohol and, when present, up to about 10% polyol. In general, the proportions of the reactants are chosen so that the ionizable resinous mixture has a softening point of less than about 125° C., preferably about 0° and about 100° C. Usefully, the resinous mixture will have an acid number between about 30 and about 150.

The volatile ionizing agent that is used to form the resinous polyelectrolyte is preferably a volatile amine conventionally used for such purposes, such as, for example, ammonia, dimethylethanolamine, methylamine, ethanolamine, diethanolamine, triethanolamine, triethylamine and the like. The ionizing agent is volatile for the purposes of the present invention when it can be removed from the resinous polyeletrolyte under conditions for volatilizing water from a latex adhesive formulation, such as room temperature evaporation and/or heating.

The resinous polyelectrolyte is prepared as described in detail in the Evans et al., U.S. Pat. No. 4,183,834 mentioned above. Usefully, the amount of the chloroprene copolymer is from about 15 to about 65% dry solids by weight, and the amount of the resinous polyelectrolyte is from about 5 to about 15% dry solids by weight, based on the total weight of the aqueous dispersion, but more or less of these materials can be used, if desired. Generally, the aqueous contact cement according to the present invention will include various additives, such as freeze-thaw stabilizer, such as ethyleneglycol, an anti-oxidant, such as conventionally used in neoprene adhesives, a pigment or colorant, and the like. These additives will be used in minor amounts and generally will not exceed about 10% based upon the total weight of the dispersion.

The present invention is illustrated in terms of its preferred embodiment in the accompanying Examples. All parts and percentages in this specification and in the appended claims are by weight, unless otherwise stated.

EXAMPLE 1

A chloroprene copolymer contact cement was prepared by mixing the following materials together for about 15-20 minutes to obtain a uniform mixture.

|  | Parts |
| --- | --- |
| Chlorobutadiene/methacrylic acid copolymer latex (47% solids) | 250 |
| Resinous electrolyte aqueous dispersion (55% solids) | 50 |
| Ethylene glycol | 15 |

The chlorobutadiene/methacrylic acid copolymer had a pH at 25° C. of 7, an average particle size of 0.3 microns and was stabilized with hydrolyzed polyvinylalcohol.

The resinous electrolyte was an aqueous dispersion of the reaction product of rosin, butenedioic acid, decanol and glycerol having a number average molecular weight of about 1400, an acid number of about 22.9, a softening point of about 60° C., a flash point above about 212° C., a density of 1.02 g/cc, and ionized with diethanolamine. The aqueous dispersion used in this Example was available from Sylvachem Corporation as Aquatac 5560.

EXAMPLE 2

The procedure described in Example 1 was followed except that the 50 parts of the resinous electrolyte aqueous dispersion was 50 parts of an aqueous dispersion of the reaction product of rosin, butenedioic acid, decanol and a polyol believed to be glycerol and having a number average molecular weight of about 850, an acid number of about 38.3, a softening point of about 27° C., a flash point greater than about 212° C., a density of 1.02 g/cc and ionized with diethanolamine. The aqueous dispersion used in this Example was available from Sylvachem Corporation as Aquatac 5527. A water-based contact cement was obtained.

EXAMPLE 3

The contact cements of Examples 1 and 2 were evaluated and were determined to have the same or better performance characteristics as conventional organic solvent-based contact cements. An outstanding characteristic of the contact cements of the present is their improved high temperature performance.

For example, a hot peel test was employed in which aluminum foil was coated with a layer of the candidate contact cement, the layer dried and the aluminum foil folded over to provide contact between two layers of cement. The folded aluminum foil was passed through the nip of two pinch rollers and then placed in an oven at 240° F. Peel tests were conducted while the aluminum foil was in the oven. Conventional contact cements gave a hot peel strength of about 0.35 to about 0.50 pounds/lineal inch, whereas the cements of Examples 1 and 2 gave a hot peel strength of 0.6 to 0.8 pounds/lineal inch.

Hot peel strength is a measure of high temperature strength, which is required in those industries where the laminate is subjected to hot post-forming operations. Typical of such applications is hot post-forming of laminates of plastic sheets (e.g. melamine and phenolic materials) to wood and other base materials.

I claim:

1. An aqueous contact cement, which comprises a dispersion in water of a chloroprene copolymer of 2-chloro-1,3-butadiene and methacrylic acid and a resinous polyelectrolyte of an ionizable resinous mixture which is ionized with a volatile ionizing agent, said ionizable resinous mixture being the reaction product of a rosin, a carboxylic acid, and a $C_1$-$C_{18}$ mono-alcohol, said ionizable resinous mixture having a softening point not substantially above about 125° C. and an acid number of between about 30 and 150, said reaction product comprising the carbocyclic nucleus of rosin having at least one carboxylic acid group and at least one carboxylic acid ester group of said mono-alcohol.

2. The aqueous contact cement according to claim 1, wherein said dispersion comprises a stabilizer for said chloroprene copolymer.

3. The aqueous contact cement according to claim 2, wherein said stabilizer is a polyvinylalcohol.

4. The aqueous contact cement according to claim 1, wherein said ionizable resinous mixture is the reaction product of a rosin, a carboxylic acid, a $C_1$-$C_{18}$ mon-alcohol and a polyol.

5. The aqueous contact cement according to claim 4, wherein said rosin is a tall oil rosin, wood rosin, gum rosin or a mixture of two or more thereof.

6. The aqueous contact cement according to claim 4, wherein said carboxylic acid is an alpha-beta-ethylenically unsaturated dibasic carboxylic acid.

7. The aqueous contact cement according to claim 4, wherein said polyol is glycerol or pentaerythritol.

8. The aqueous contact cement according to claim 4, wherein said softening point is between about 0° and about 100° C.

9. The aqueous contact cement according to claim 4, wherein said ionizable resinous mixture is the reaction product of about 40-85% rosin, 5-20% carboxylic acid, 10-30% mono-alcohol.

10. The aqueous contact cement according to claim 1, wherein the amount of said chloroprene copolymer is from about 15 to about 65% by weight and the amount of said resinous polyelectrolyte is from about 5 to about 15% by weight, based on the total weight of said dispersion.

11. The aqueous contact cement according to claim 1, wherein said dispersion also comprises at least one member selected from the group consisting of an antioxidant, a pigment or colorant, and a freeze-thaw stabilizer.

12. The aqueous contact cement according to claim 1, wherein said ionizing agent is a volatile amine.

* * * * *